March 11, 1958 — D. E. HULL — 2,826,700
FLUID FLOW MEASUREMENT
Filed April 27, 1956 — 2 Sheets-Sheet 1

INVENTOR
DONALD E. HULL
BY
ATTORNEYS

March 11, 1958

D. E. HULL 2,826,700

FLUID FLOW MEASUREMENT

Filed April 27, 1956

INVENTOR
DONALD E. HULL
BY
ATTORNEYS

United States Patent Office 2,826,700
Patented Mar. 11, 1958

2,826,700

FLUID FLOW MEASUREMENT

Donald E. Hull, San Rafael, Calif., assignor to California Research Corporation, San Francisco, Calif., a corporation of Delaware Application April 27, 1956, Serial No. 581,099

9 Claims. (Cl. 250—43.5)

This invention relates broadly to methods and apparatus for measuring the rate of fluid flow at a given point in a pipe line, conduit, or other fluid-conducting passage, by the introduction at that point of a known quantity of a material radioactive which is miscible or soluble in the fluid being conducted and is adapted to modify a detectable property of that fluid, followed by the step of detecting or monitoring the modification so made in at least a part of the stream and integrating the detector response during the transit of the modified property in that part of the stream passing the detector, the integrated response indicating the rate of fluid flow at the said given point.

This application is a continuation-in-part of my co-pending application Serial No. 465,602, filed October 29, 1954, which contains claims directed to the methods described herein.

A specific application of the principle of this invention relates to method and apparatus for measuring the rate of fluid flow in pipe lines or other fluid-conducting passages by the introduction of a known quantity of radioactive material, and particularly refers to the steps of determining the total number of gamma or other suitable radioactive rays registered by a detector associated with the pipe or passage through which the known quantity of radioactive material has been passed, and comparing that number with a response characteristic of the system to determine the values of flow rate in terms of quantity per unit time.

This specific application of the invention is based upon the discovery that, under the flow conditions just outlined, the integral or total number of gamma or other suitable radioactive rays detected is inversely proportional to the velocity of flow, but is independent of the way in which the radioactivity is spread out along the segment of the fluid stream due to flow conditions therein.

Heretofore, it has been considered necessary to consider the volume of fluid in a known length of pipe or passage, as, for example, in the procedure described in U. S. Patent 2,631,242. In that procedure, a small quantity of a soluble or miscible radioactive material, e. g., an isotope which will emit a substantial quantity of alpha, beta, or preferably gamma radiation, is injected into the pipe and a determination is made of the time required for its subsequent passage between two spaced points which define a known volume. This usually requires a considerable length of uniform pipe, free from branch connections, flow restrictions, or the like. Suitably responsive detectors are mounted at selected spaced points and are connected through pre-amplifiers to a single counting rate meter and a chart recorder. The two successive peaks caused by passage of the injected body or slug of radioactive tracer are thus recorded on a convenient time scale. The known volume of the pipe section between the detecting points is divided by the observed time interval to determine the flow rate.

This invention, however, requires only the steps of injecting a known small quantity of a radioactive fluid into the flow stream to be measured, and monitoring the stream to obtain a time-integral value of the effect of the radioactivity during its passage or transit by a given point. This may be done by means of a single detector unit, for example, a Geiger tube, which is placed in the stream or adjacent the pipe wall at any convenient downstream location. The total radioactivity A, of the injected fluid is known, for example, one millicurie, and the total counts, N, detected from the radioactive material passing the single detecting point are measured by a suitable counting and totalizing meter. If the flow rate in absolute units is required, for example, gallons per minute, a calibration may be made on a short length of an equivalent conduit or confined fluid passage containing a known concentration of radioactive material with an equivalent detector arrangement to obtain a response characteristic or proportionality factor, F, which may be expressed, for example, as counts per minute from one millicurie of radioactive material per gallon of fluid. The flow rate to be determined is then found by the equation:

$$V = \frac{FA}{N}$$

where:

$V$ = flow rate, gallons per minute
$A$ = quantity of radioactivity added in millicuries
$N$ = net counts during passage of quantity A which may be done by computation, or the use of an appropriate chart or nomograph or by automatic electrical equipment. In the determination of the total counts N, the background count due to natural radioactivity, cosmic rays, etc., is subtracted from the indicated value, as is conventional in such measurements in this art.

If only relative flow rates are needed, the specific value of the response characteristic or proportionality factor F may not be required, as it is quite feasible to standardize upon the quantity of radioactive material to be injected under different or varying rates of flow, the latter being determinable upon the basis of $$V \sim \frac{A}{N}$$

wherein the terms V, A, and N are the same as given above, in appropriate units.

Also, if one flow rate is known under such conditions, the others may readily be determinable as absolute values, i. e., in quantities per unit time.

The following discussion outlines in more detail the mathematical basis for this improved measuring procedure, which has been amply proved by field utilization, as will be set forth in examples below.

This method is based upon the principle of integrating the response of a detector of radioactivity, for example, a Geiger counter, while a definite quantity of a radioactive isotope tracer having known properties flows through the pipe or passage with which the detector is associated. The number of counts so recorded, after subtracting the background, is independent of the way in which the concentration of tracer varies along the pipe, but is inversely proportional to the velocity at which the tracer flows past the detection point. The number of counts, for example, registered by the detecting and indicating equipment does depend upon the pipe dimensions and the placement of the detector units with respect to the fluid stream and the passage through which it moves. A proportionality factor or response characteristic for a given size, material, and type of pipe may be determined by filling short section of the same or equivalent pipe with a fluid containing a known concentration of the specific radioactive isotope and noting the counting rate of the detector, also placed in a comparable position to that of the field use. The factor F, which represents counts per unit time registered from a unit of radioactivity per unit volume, as, for example, counts per minute from one microcurie per gallon, may be used in the above-mentioned equation to calculate absolute values of flow rates, as is shown by the following discussion.

Let N be the integral number of counts and R be the instantaneous counting rate, both corrected for background. Then, over the duration of the passage of the tracer:

$$N = \int R \, dt \qquad (1)$$

Now R is proportional to the continually varying concentration, C, of the tracer. The proportionality constant is the factor, F, determined by calibration for a given pipe and detector geometry.

$$R = FC \qquad (2)$$

Substituting, $$N = F \int C \, dt \qquad (3)$$

Let V be the flow rate in gallons per minute. Then $dq$, the increment of volume passing during the interval $dt$, is $$dq = V \, dt \qquad (4)$$

Again substituting:

$$N = \frac{F}{V} \int C \, dq \qquad (5)$$

But the integral of radioisotope concentration over the total volume is simply the total quantity, A, of radiotracer, expressed in appropriate units, e. g., millicuries.

$$\int C \, dq = A \qquad (6)$$

Hence, $$N = \frac{FA}{V} \qquad (7)$$

Solving for flow rate, $$V = \frac{FA}{N} \qquad (8)$$

Assuming that F has been determined for a given isotope in a given pipe, the experimental measurement of the quantity of isotope injected, A, and of the number of counts recorded, N, gives the necessary data for calculating V.

It is an object of this invention to provide an improved method and means for determining the relative or absolute values of flow rates of fluids, either gases or liquids, in confined passages without disturbing either the fluid being transmitted or the conduit or passage through which it flows.

Another object is to provide an improved method and means for flow rate determination that may be applied to existing installations without substantial alterations thereto.

Another object is to provide method and apparatus for measuring the rate of fluid flow at a given point in pipe lines, conduits, canals, rivers, or other fluid-conducting passages, by the single or pulsed introduction of a known quantity of a fluid radioisotope which is miscible or soluble in the stream and which may be detected at a point downstream by an appropriate instrument, the output of which gives a signal or indication which may be integrated or counted in appropriate units during the time of transit of all or part of the segment of the stream containing the radioisotope past the detector unit, the integrated response being an indication of the rate of fluid flow in the main stream at the point of introduction of the modifying fluid.

Another object is to provide an improved method and means for flow rate determination that is essentially simple to install and to operate, which may be made portable and thereby usable for intermittent or infrequent applications, and which uses available radioisotopes which are in such low concentrations and small quantities that they are safe to handle without unusual or expensive health precautions, shields, etc.

Another object is to provide a method and means for utilizing radiotracer technique in fluid flow determination that may be made in remote or hazardous locations that preclude human attendance or physical manipulation by operators.

Another object is to provide a method and means for fluid flow determination that may be made substantially automatic in operation.

These and other objects and advantages will be further apparent from the following description and the attached drawing, which forms part of this specification, and illustrates several embodiments of means suitable for practicing this invention.

Before discussing the general features of the invention, a detailed discussion of its specific application to the use of a radioactive tracer will be discussed.

Figure 1:
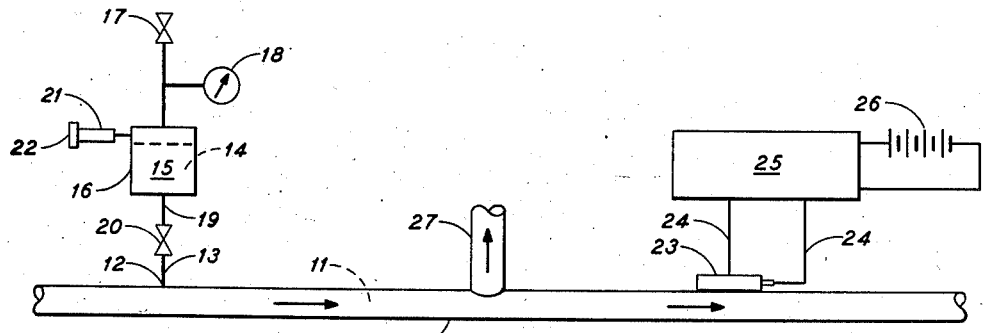
Figure 1 is a diagrammatic elevational view of a simple form of apparatus for measuring either the relative or absolute value of fluid flow as applied to a pipe or conduit system.
Figure 2:
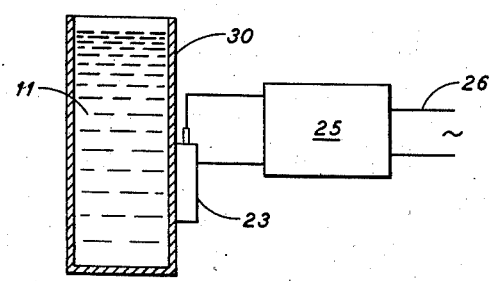
Figure 2 is a vertical and part sectional view of a simple form of apparatus for determining the proportionality factor or response characteristic of a specific installation of detector, conduit and counting meter.

Referring to the drawings, and particularly to Figures 1 and 2, reference numeral 10 designates a pipe or conduit through which a fluid 11 is passing at a flow rate which is to be determined. At a convenient point 12, a small branch connection or pipe 13 is provided to permit the introduction of a predetermined quantity of radioisotope 14 contained in an injector generally designated 15. A convenient arrangement of the injector may be a closed metal vessel 16 having a valved inlet 17 to which is attached a pressure gage 18. The outlet 19 of vessel 16 communicates through valve 20 to the branch connection 13 leading to pipe 10. If a liquid isotope solution is used, means for pressurizing vessel 16 are provided, such as a small side chamber 21, communicating with the upper part of vessel 16 and adapted to receive a metal bulb filled with carbon dioxide or other inert gas under pressure higher than that in line 10. Means are provided responsive to application of the closure cap 22 or other parts of chamber 21 to perforate the closure of the bulb and release the gas contents into vessel 16, which will be indicated by an increased reading of pressure gage 18. Bulb-discharging devices of the nature discussed are commercially available for a variety of uses such as inflating life belts, charging carbonated water bottles, etc. An example of such a device is shown in U. S. Patent No. 2,066,517. Gage 18 is also useful to indicate, by a suddenly lowered reading, when all the liquid 14 has been expelled from injector 15.

At a convenient point downstream from point 12 along pipe 10, at a distance which will assure adequate mixing of the isotope 14 with fluid 11, one or more radiation detectors 23 as Geiger tubes, scintillation counters or other suitable roadioactive detector devices are temporarily of permanently placed adjacent to the pipe. The type and position of the detector installation is determined by the nature of the radiation to be detected, for example, if alpha or beta particles are to be observed, a suitably transparent window must be used, or the detector unit is optionally placed in a well or tube extending into pipe 10. Generally, a gamma-emitting isotope is preferred, such as cesium$^{134}$, salts of which are soluble in water and would be usable if the fluid 10 were aqueous. That isotope emits two gamma rays (0.60 and 0.79 m. e. v.) and has a 2.3 year half-life, which makes it convenient to handle and store. Also, its ready solubility in water makes contamination problems negligible. Even if accidentally swallowed, its chemical similarity to sodium causes its elimination from the body in a matter of days If the fluid 11 is non-aqueous, for example, oil, a suitable isotope would be an oil solution of radioactive antimony, e. g., triphenyl stibine containing antimony$^{124}$ which emits gamma rays with an energy of 1.7 m. e. v. and has a half-life of 60 days. Cobalt naphthenate containing cobalt$^{60}$ is another oil-soluble compound which emits gamma rays of 1.17 and 1.33 m. e. v. and has a half-life of 5.2 years. For gas streams, suitable radioactive isotope are available, e. g., xenon$^{135}$ or krypton$^{85}$, which can be charged under suitable pressure with an inert carrier gas such as nitrogen into injector 15.

The response from detector 23 is suitably transmitted through wires 24 to a conventional electrical impulse counter 25 arranged as a totalizer, so that it records the total of the counts detected from the radioactive material added to the fluid stream 11. Counter 25 is energized from a suitable power source 26. If only relative fluid flow ratios are desired, the same quantity of radioisotope 14, for example, one millicurie, may be charged repeatedly into line 10, and, by comparing the integrated or total counts, the relative flow rate may be determined from the inverse ratio mentioned above.

Desirably, however, the response characteristic or proportionality constant, F, defined above, and expressed in appropriate units, for example, counts per minute from one microcurie per gallon, is determined for the types, materials, and sizes of conduits, pipes or passages wherein the flow of a certain aqueous or non-aqueous liquid or gas is to be measured with a specific arrangement of detecting equipment. As the factor F depends upon materials and thicknesses of such conduits, a series of determinations may be made for calibration and the results used thereafter in field tests or routine operations of fluid flow measurements.

Referring to Figure 2 of the drawings, reference numeral 30 designates a short length of a pipe or conduit of the same material, diameter and thickness as pipe 10, closed at one end and substantially filled with the same fluid, in this case water, which passes through the pipe 10 wherein the flow rate is to be measured. One or more detectors 23 are arranged adjacent to pipe section 30 in the same manner as in the actual field flow measuring procedure. Counting meter 25, which need not be arranged as an integrator, but only a rate-indicator, is suitably connected to the detectors. The water 11 with which pipe section 30 is filled contains a known concentration of the radioactive isotope which is to be used in the measuring procedure. The response characteristic or proportionality factor of the Figure 2 arrangement may thus be determined, taking into consideration the normal background count, to obtain the factor, F, discussed above.

A typical example of such a group of determinations for conduits carrying sea water involved sections 30 of pipe, each about two feet long, closed at one end and filled with a solution containing 42.3 microcuries (0.0423 millicuries) of cesium$^{134}$ in a 1% solution of sodium chloride in water. A single 12-inch Geiger tube was secured to the outside of the pipe section 30 midway between the ends, and the count rate was measured to 0.5% standard deviation. The following results were obtained.

TABLE I

| Pipe Diameter (Inch) Inside | Material | Wall Thickness (Inch) | Type of Lining | Lining Thickness (Inch) | Count Rate, (Counts per sec.) | Proportionality Factor, F (Counts/sec. per mc./gal.) |
|---|---|---|---|---|---|---|
| 8 | Steel | 0.322 | Portland Cement | 0.50 | 222.1 | 315 |
| 6 | do | 0.344 | do | 0.31 | 186.5 | 264 |
| 6 | do | 0.438 | None | | 186.3 | 264 |
| 4 | do | 0.237 | Portland Cement | .25 | 144.1 | 205 |
| 3 | do | 0.216 | do | 0.25 | 81.6 | 116 |
| 2 | do | 0.219 | None | | 75.1 | 107 |
| 1½ | do | 0.187 | do | | 55.1 | 78 |
| 1½ | Brass | 0.156 | do | | 70.2 | 100 |

Another typical example of this invention applied to water supplied to a vapor condenser is illustrated below.

TABLE II
*Flow rate by total-count method*

Pipe size _____ 8 inch.
Initial background _____ 6960/16=435 counts/min.
Final background _____ 4024/9=447 counts/min.
Tracer counts _____ 6176 counts/3 min.
Background subtraction _____ 1320=3×440.
Net count N _____ 4856 counts.
Activity of tracer A _____ 4240 microcuries.
Calibration factor F _____ 315×4=1260.
Flow rate V _____ 1100 gal./min.
Standard deviation _____ ±25.

The meter on the feed line to this condenser showed a reading of 510 gal./min. Engineering calculations based on the heat supplied to the feed preheaters had pointed to a flow rate of about 1100 gal./min. The radioactive test showed that the meter was definiely wrong and supported the heat-balance figure.

Table III shows the internal consistency of the method in two pairs of duplicate tests.

TABLE III

*Flow rates in 8-inch pipe*

| Test No. | 1A | 1B | 2A | 2B |
|---|---|---|---|---|
| Tracer Activity, $\mu c$ | 926 | 1,038 | 992 | 979 |
| Net Total Counts | 924 | 1,050 | 1,310 | 1,256 |
| Flow rate, gal./min | 1,260 | 1,240 | 950 | 980 |
| Standard Deviation | ±80 | ±60 | ±50 | ±50 |

A further illustration of the invention was carried out in the waste water effluent from a large oil refinery. This was chiefly salt water which had been used for cooling various refinery units. It was all combined in a settling tank to separate hydrocarbons which collected in the water from miscellaneous sources. The water from this separator flowed out through a 5-foot by 9-foot enclosed concrete channel, 150 feet long, into an open canal.

For this test, a bundle of four 12-inch Geiger tubes was mounted in a 3-foot plastic pipe, closed at the bottom to exclude entrance of water. This floated vertically in water with the tubes about 10 inches under the surface. This detector was calibrated for the test in a barrel of cesium[134] chloride solution in water. The counting sensitivity was $$13,400 \frac{\text{counts}/\mu c.}{\text{minute/gal.}}$$

The barrel was 22 inches in diameter, so the thickness of solution surrounding the counters was only about 10 inches. This is about three times the thickness for half-absorption of the cesium gamma rays, hence, the calibration factor found is probably about 10% less than it would be in an infinite medium.

Three tests were made, placing the counter in three different positions in the stream:

(1) In midstream, in a strong, turbulent current.

(2) About 2 feet from the west side of the channel, where the counter swung around in an ellipse alternately in a strong current and in relatively quiet water near the edge.

(3) About 2 feet from the east side of the stream, in a region of very strong turbulence where the backwater from a tributary stream merged with the main stream.

The results are shown in Table IV.

TABLE IV

*Flow rates in open channel*

| Position | Tracer, $\mu c$. | Counts | Flow Rate, gal./min. |
|---|---|---|---|
| 1 | 7.33 | 7,000 | 14,000±200 |
| 2 | 1.81 | 1,670 | 14,500±500 |
| 3 | 1.39 | 910 | 20,500±1,000 |

To check in values at the first two points is well within the statistical accuracy of the measurement. This leads to two conclusions:

(1) The tracer was thoroughly mixed in the stream.

(2) The same values being found in quiet and in swift water emphasizes the unexpected finding that eddy currents do not affect the measurement.

The third measurement was made in a portion of the stream where the tracered water was diluted with untracered water from the side stream. Consequently, the count was low, and the calculated flow rate too high. This points to a warning that the method is desirably to be used only for completely transversely mixed streams. Further downstream, where the diluting water would be thoroughly transversely mixed with the whole stream, a uniformly lower count would be expected, corresponding to the higher flow rate.

It can be shown that, even if a portion of the fluid 11 flowing in pipe section 10 is diverted, as through branch 27, the response of detector 23 will still be an accurate indication of the rate of flow at point 12. Under such circumstances, the total quantity of radioactivity introduced into fluid 11 at 12 remains constant. That portion flowing past detector 23 is now moving at a slower rate due to the diverted stream through branch 27. The longer time required for the radioactive material to flow past the detector exactly counteracts the effect of reduced amount of radioactivity at that point as will be apparent from the foregoing discussion, so that the totalized or integrated counts of the unit 25 will be exactly the same as if no fluid had been diverted from the pipe 10.

Hence, if access can be had to any downstream point in a branching system for placement of a detector, the flow rate at the tracer injection point can be determined.

Figure 3:
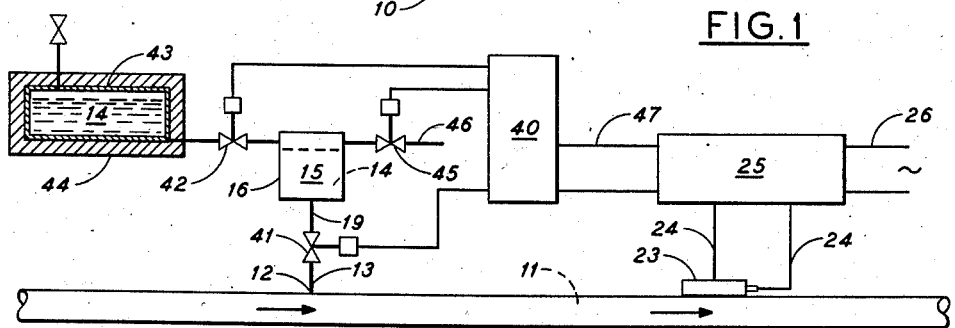
Figure 3 is a diagrammatic elevational view of a simple form of equipment for practicing the method wherein automatic repetitive measurements are obtained to give a substantially continuous determination of flow rate.

Referring now to the arrangement of Figure 3, which illustrates an installation in which periodic introductions are made of a known quantity of radioactive material to give an automatic indication of flow rate in pipe 10, reference numeral 40 designates a timer suitably connected to control valves 41 and 42 which periodically admit the desired metered quantity of radioactive material from injector 15 into pipe line 10. During the time interval between such additions, injector 15 is refilled or recharged from the radioactive isotope storage tank 43, which is desirably enclosed in shield 44. Injector 15 is repressured by valve 45, which admits nitrogen or carbon dioxide gas or other pressurizing fluid to vessel 16 through line 46 from a suitable source (not shown).

The same type of detector unit 23 and counting totalizer 25 may be used as in the arrangement of Figure 1, and timer 40 is connected to the totalizer by a circuit 47 to initiate and terminate its operation to keep it compatible or in step with the introduction of the radioactive material. For example, at the start of a given cycle of operation, timer 40 first actuates valve 41 to admit the metered quantity of radioactivity to pipe line 10. Either at once or a suitable time thereafter, depending upon the rate of flow of fluid 11 in pipe 10, the totalizing counter 25 is reset to zero and started in operation by timer 40 through circuit 47. The timer 40 then acts to close valve 41 and open valve 42 to admit an additional quantity of isotope from storage tank 43 to metering vessel 16. Valve 42 is then closed and repressuring valve 45 is opened by timer 40 for a period of time adequate to bring vessel 16 to the proper pressure for the succeeding isotope injection.

Meanwhile, the previously introduced quantity of radioactive material 14 has passed through line 10 to be registered by counter 25 which totalizes the response of detector 23. Desirably, but not necessarily, the counter 25 is equipped with a background-subtracting arrangement of a type available in this art, and has a suitable scale calibrated in appropriate units of flow rate, such as gallons per minute, based upon the mathematical relations already discussed. Thus, during the cycle just described, the arrangement will give the desired indication of rate of flow in pipe or passage 10 at point 12. At a desired subsequent time, depending upon how accurately the flow rate is to be determined and the probability of variations in flow rate that may occur in pipe 10, the cycle may be repeated.

Figure 4:
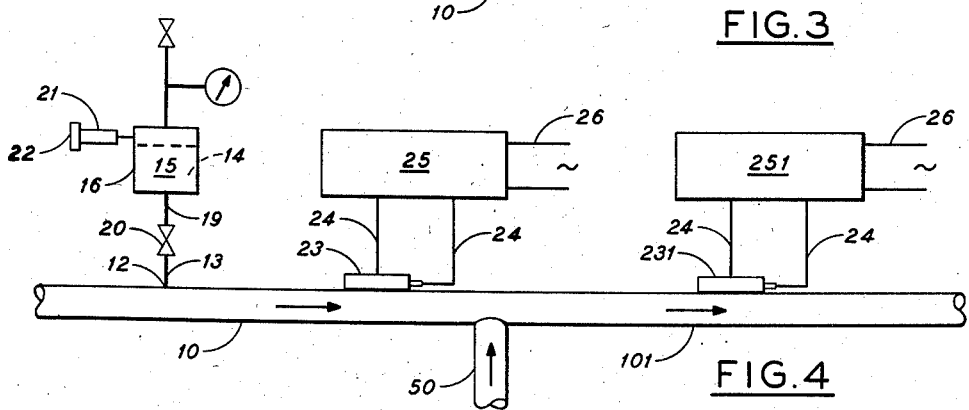
Figure 4 is a diagrammatic elevational view of an arrangement for determining the fluid flow conditions in a system fed from more than one fluid source.

A further application of the broad features of this method is shown in Figure 4 of the drawing, which illustrates a branched conduit system in which a first flow of fluid in line 10 is supplemented by a second flow entering from branch 50. In this case, it is desired to learn the flow rate through line 10 both above and below the branch 50. The flow rate of the fluid entering the system through branch 50 may then be obtained by simple subtraction.

One arrangement for doing this involves two detectors 23 and 231 and their corresponding count totalizing or integrating units 25 and 251, with a single radioactive fluid injector 15 similar to that already described. The total count response of detector 23 and counter 25 indicates the flow rate in conduit 10 at point 12. The entry of fluid from branch 50 dilutes the radioactive isotope concentration in the right-hand section of conduit 10, herein designated 101, but the total amount of radioactivity remains the same. The flow rate in 101, however, is greater than in 10, so that this same quantity of radioactivity will pass detector 231 in a shorter time and will result in a lower total count from detector 231 that is registered by totalizer 251. By the inverse proportion relation outlined above, the respective rates of flow in 10 and 101 may be determined by comparison of the respective total counts.

Desirably, the diameters and materials of conduits 10 and 101 should be the same, so that a single proportionality factor, F, could be used for both. However, this is not essential, as it is quite feasible to determine separate factors F for each section, if the conduit system so requires.

Figure 5:
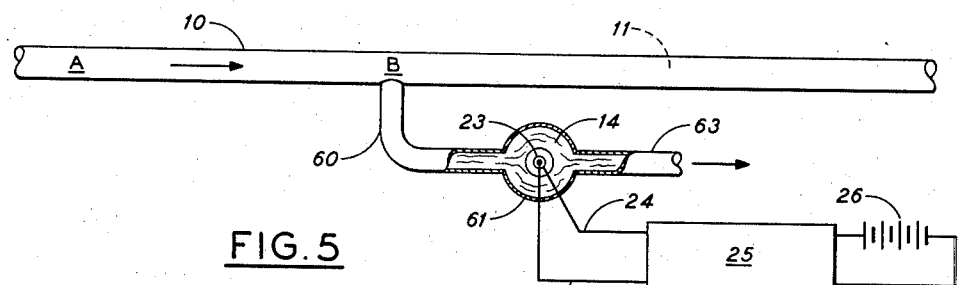
Figure 5 is a diagrammatic elevational view of a simple form of apparatus for measuring fluid flow as applied to a pipe or conduit system, or a canal, river, creek, or other passage conveying a fluid stream, in which a small stream is diverted from the main passage and flowed around a detector for the property to be determined.
Figure 6:
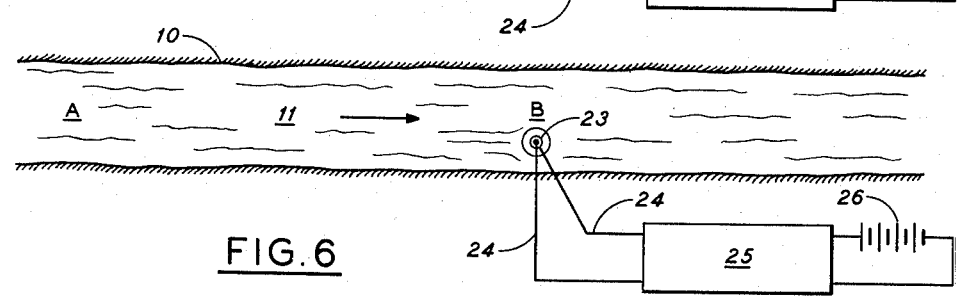
Figure 6 is a plan view of an arrangement for determining the fluid flow in a river, canal, or the like, in which the detector is suspended in the entire flowing stream at a predetermined location B below the point of introduction A of the property-modifying fluid.

If it is convenient or desirable to place the detector 23 directly in a diverted portion of the fluid flowing through the pipe or passage or in the passage itself, the arrangements illustrated diagrammatically in Figures 5 and 6 may be used.

Referring to Figure 5, the known quantity of radioisotope is introduced into the main stream of fluid passing through conduit 10 at point A, chosen to be a sufficient distance above point B so that substantially complete transverse mixing is attained before any portion of the isotope reaches the latter point. The concentration of the isotope along the stream will vary according to well-known diffusion phenomena, but this is immaterial.

At point B a small stream is withdrawn from passage 10 through line 60 and passed through a container 61 in which an appropriate detector generally designated 23 is positioned. The diverted stream is continuously withdrawn from container 61 through an outlet pipe 63. By this means a sample of the main stream, having the same concentration of radioisotope therein at any given instant, is withdrawn and monitored by detector 23 and integrator 25 during the entire transit of the radioactive segment past the point B. To determine the response characteristics of the detector 23 for a given concentration of radioisotope in a sample of the liquid flowing in conduit 10, a small container 301 having a known concentration of radioisotope therein may be used in the arrangement of Figure 8 to determine the response characteristic F in appropriate units, as pointed out in the foregoing discussion.

In the example of Figure 6, where the detector unit is immersed in the main stream, the exact positioning of the detector with respect to the cross-section of the stream is substantially immaterial; even in the case of transverse variations in flow rate of eddies it has been found that the response of the detector is an accurate profile of the modification which has been made in the physical properties of the main stream.

Figure 7:
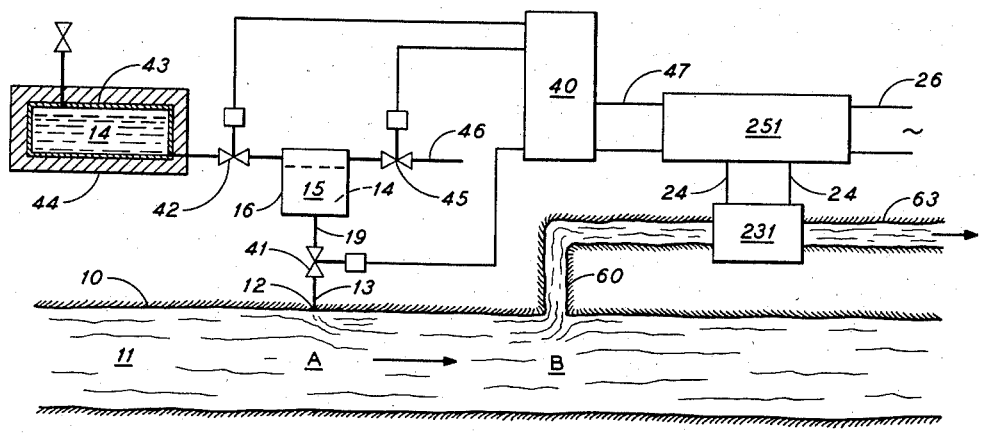
Figure 7 is a diagrammatic elevational view of a simple form of equipment for practicing the method wherein automatic repetitive measurements are obtained to give a substantially continuous determination of flow rate, a part of the stream being diverted through an appropriate detector for the modified property which has been imparted to the main stream.

As stated in the identification of the drawings, Figure 7 represents an arrangement similar to Figure 3, already described in detail, but with a detector 231 for a diverted or branch portion 60 of the main fluid stream 11. The diverted stream 60 flows continuously past or through detector 231 and through outlet 63. The response of detector 231 is fed through leads 24 to totalizing counter 251, connected by leads 47 to timer 40, which has the same function and associated equipment as that already described for Figure 3, so that further detailed description would be repetitious and unnecessary.

Figure 8:
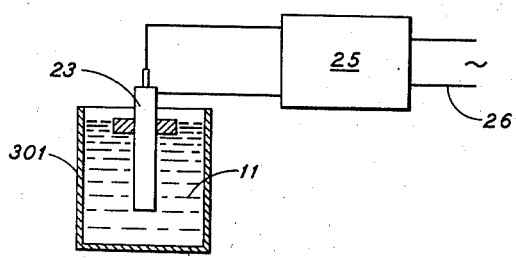
Figure 8 is a vertical and part sectional view of a simple form of apparatus, alternative to that of Figure 2, for determining the proportionality factor or response characteristic of a specific installation of a detector and a counting meter to a known concentration of a property-modifying material in a sample of the fluid flowing in the stream whose flow rate is to be determined.

Referring now to Figure 8, which represents an alternative apparatus to that of Figure 2, for determining the response characteristic of a detector to a known concentration of radioactivity, reference numeral 301 indicates any suitable container for liquid 11, and detector 23 is immersed therein to a given depth, as shown. The detector response is counted by meter 25, which need not be arranged as an integrator, but only as a rate-meter, to determine the factor F, expressed as counts per unit time registered from a unit of radioactivity per unit volume. For example, it may be expressed as counts per minute per microcurie per gallon.

Although specific embodiments of means and procedures for carrying out this method have been illustrated and described herein, it is apparent that other arrangements and steps may be employed, and all such changes and modifications that come within the scope of the appended claims are intended to be embraced thereby.

I claim:

1. A fluid flow measuring device for a confined passage, conduit, or pipe system, consisting of means for introducing a specific quantity of radioactivity into the fluid flowing in said system, a single detector of radioactivity downstream from said first-named means, and an integrator for totalizing the response of said detector to the passage of said introduced radioactivity.

2. Apparatus responsive to the rate of volumetric flow of fluid in a fluid stream, consisting of means for introducing a specific quantity of fluid radioactive isotope into said stream to disperse the radioactive fluid in a segment of said stream, means forming a single detector adapted to respond to at least a portion of said segment as it flows past a downstream point, and integrating means for totalizing the response of said detector to the transit of that portion of said segment passing said detector.

3. Apparatus according to claim 2 in which said first-named means comprises a container for a quantity of radioactive material, means for selectively connecting said container to said system and means associated with said container for ejecting the radioactive material therefrom into said system.

4. Apparatus according to claim 2 with the addition of timing means adapted to actuate sequentially said first-named means and said integrator, and means responsive to said timer for recharging said first-named means with radio-active material.

5. Apparatus responsive to the rate of volumetric flow of fluid in a fluid stream system supplied from a plurality of sources, comprising means for introducing a specific quantity of a fluid radioisotope into one of said sources to disperse the radioactive fluid in a segment of said stream, means forming a first single detector adapted to respond to at least a portion of said segment as it flows past a downstream point that is ahead of the second fluid source entering said system, means forming a second single detector adapted to respond to at least a portion of said segment after said first and said second fluid sources have combined, and an integrator for each of said detectors, whereby the relative rates of flow of said first and second sources may be determined.

6. Apparatus responsive to the rate of volumetric flow of fluid in a fluid stream, comprising means for introducing a specific quantity of a fluid radioisotope into said stream to disperse the radioactive fluid in a segment of said stream, means for diverting a portion of said fluid stream containing a representative portion of said segment, means forming a single detector for radioactivity adapted to respond to the transit of said segment past a point in said diverted fluid stream, and an integrator for said detector means, whereby the total flow rate in said fluid stream at the point of introduction of said radio-isotope may be determined.

7. Apparatus according to claim 6, in which said first-named means comprises a container for a quantity of radioactive material, means for selectively connecting said container to said system and means associated with said container for ejecting the radioactive material therefrom into said system.

8. Apparatus according to claim 6, with the addition of timing means adapted to actuate sequentially said first-named means and said integrator, and means responsive to said timer for recharging said first-named means with radioactive material.

9. Apparatus for indicating the rate of flow of fluid in a fluid stream comprising means for periodically introducing a predetermined quantity of a fluid radioactive isotope into said stream to disperse said radioactive fluid in a segment of said stream, means forming a single detector of predetermined response characteristic adapted to respond to at least a portion of said segment as it flows past a downstream point, integrating means for totalizing the response of said detector to the transit of that portion of said segment passing said detector, and means for combining the known values of radioactivity and detector characteristic with the integrated detector response to indicate the volumetric rate of flow of said stream.

References Cited in the file of this patent

UNITED STATES PATENTS

| | | |
|---|---|---|
| 1,291,489 | Hadaway | Jan. 14, 1919 |
| 2,627,543 | Obermaier | Feb. 3, 1953 |
| 2,631,242 | Metcalf | Mar. 10, 1953 |
| 2,706,252 | Mithoff et al. | Apr. 12, 1955 |

OTHER REFERENCES

"Nucleonics," April 1955, pp. 18 and 19. Published April 12, 1955.